(12) United States Patent
Sato et al.

(10) Patent No.: US 6,332,859 B1
(45) Date of Patent: Dec. 25, 2001

(54) CONTROL SYSTEM AND METHOD FOR CONTINUOUSLY VARIABLE TRANSMISSION

(75) Inventors: Hironobu Sato; Hiroki Tamura; Masato Tojo; Kenji Misaki; Atsushi Takeda; Kazuchika Tashima, all of Aichi; Kenichi Nakamori, Kobari-cho; Hiroki Asayama, Aichi, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,453

(22) Filed: May 17, 2000

(30) Foreign Application Priority Data

May 17, 1999 (JP) .................................. 11-135779

(51) Int. Cl.$^7$ ............................ B60K 41/12; B60K 41/04
(52) U.S. Cl. ............................. 477/43; 477/44; 477/115
(58) Field of Search ................................. 477/37, 43, 41, 477/45, 46, 115, 120, 121; 701/51, 35, 60

(56) References Cited

U.S. PATENT DOCUMENTS

| | | | |
|---|---|---|---|
| 4,515,041 | * | 5/1985 | Frank et al. ............................ 477/43 |
| 4,546,673 | * | 10/1985 | Shigematsu et al. ............. 477/120 X |
| 4,700,590 | * | 10/1987 | Omitsu ................................ 477/43 X |
| 5,413,540 | * | 5/1995 | Streib et al. ............................. 477/43 |
| 5,468,195 | * | 11/1995 | Kashiwabara ........................... 477/46 |
| 5,620,392 | * | 4/1997 | Genise .................................. 477/120 |
| 6,181,020 | * | 1/2001 | Uchida et al. ....................... 477/43 X |
| 6,188,944 | * | 2/2001 | Kolmanovsky et al. .............. 477/43 |
| 6,226,585 | * | 5/2001 | Cullen ............................... 477/115 X |

* cited by examiner

*Primary Examiner*—Sherry Estremsky
*Assistant Examiner*—Roger Pang

(57) ABSTRACT

A control system for a continuously variable transmission, in which a responsiveness and a generation of an excessive force in a steady state are compatible. The control system makes a belt slippage prevention and a fuel economy improvement compatible by controlling a CVT with one of two parameter values: the first parameter value which is determined from an engine RPM and an accelerator opening, i.e., a torque information quick in the output timing but poor in the precision and which indicates the engine output torque; and the second parameter value which is determined from a fuel injection rate, i.e., a torque information excellent in the precision but slow in the output timing and which indicates the engine output torque.

10 Claims, 2 Drawing Sheets

CONTROL SYSTEM AND METHOD FOR CONTINUOUSLY VARIABLE TRANSMISSION

BACKGROUND OF THE INVENTION

1. Field of the Invention

The present invention relates to a control system for controlling a continuously variable transmission on the basis of parameters indicating an engine output torque.

2. Related Art

The continuously variable transmission to be mounted on an automobile is exemplified by a continuously variable transmission (as will be called the "CVT") which is constructed by combining a metallic belt and a pair of (primary/ secondary) pulleys having a variable groove width, for example.

In this CVT, the speed or RPM (Revolutions Per Minute) of an engine, as inputted from the primary pulley, is changed with the change in the winding diameter of the belt made to run between the two pulleys, and is transmitted from the secondary pulley to the differential and the drive wheels. Moreover, a gear ratio is controlled by adjusting the flow of oil fed to the primary pulley.

On the other hand, the torque, transmitted between the primary pulley and the secondary pulley, is determined by the force for pushing the belt between those pulleys. In the CVT, therefore, a line pressure control is made to push the belt sliplessly with the secondary pulley by using an oil pressure, for example. As this line pressure grows higher, the force to push the belt becomes the higher. If a pushing force higher than necessary is applied to the belt, however, the smooth movement of the belt is deteriorated. Therefore, the line pressure control is performed under a target value which is determined on the basis of the input torque inputted to the CVT (i.e., the torque outputted from the engine) and the gear ratio.

This line pressure control is made in the prior art on the basis of a torque information dictated by an average effective pressure (which is calculated by dividing the torque by the displacement of the engine and which indicates a parameter value of the engine output torque) calculated on the basis of a demanded value of an engine output demanded by the driver, by using a value estimated from the average effective pressure as the engine output torque.

Here, the torque information, obtained on the basis of the accelerator opening, is not the information of the torque which is generated from the engine by burning a fuel, but the preceding torque information which was intended to generate the power. Thus, the torque information has a quick output timing and an excellent responsiveness for a shift in which the torque abruptly changes. However, the torque information has a poor precision because it is estimated from the value demanded by the driver.

In a steady state with little torque change, therefore, because of a poor precision of the torque information, the frequency of generating an excessive belt pushing force is so high that the fuel economy (i.e., miles/gallon) of the automobile is adversely affected.

SUMMARY OF THE INVENTION

The invention has been conceived in view of the background thus far described and has an object to provide a control system for a continuously variable transmission, which can make compatible the belt slippage prevention based on the responsiveness of the continuously variable transmission at a shifting time of an abrupt torque change, and a control for suppressing an excessive belt pushing force in a steady state of the continuously variable transmission during little torque change.

According to a first aspect of the invention, there is provided a control system for a continuously variable transmission, comprising: a first element for determining a first parameter value indicating an engine output torque from the engine RPM and the value of an engine output demanded by the driver; a second element for determining a second parameter value indicating the engine output torque from a parameter value corresponding to a rate of fuel injection into the engine; a selection element for selecting one of the first parameter value and the second parameter value; and a control element for controlling the continuously variable transmission on the basis of the selected parameter value.

In the continuously variable transmission control system, the selection element may output, at a fuel cutting drive, a value, which is determined by adding a load on an accessory connected to the engine to the first parameter value, to the control element.

In the continuously variable transmission control system, the selection element may select the larger one of the first parameter value and the second parameter value, when the torque abruptly rises, and the second parameter value when the torque does not abruptly rise.

In the continuously variable transmission control system, the force to push the pulley of the continuously variable transmission may be controlled by a fluid pressure fed to the continuously variable transmission, and may comprise a gear ratio detecting element for detecting the gear ratio of the continuously variable transmission. The control element may calculate a target feed fluid pressure to be fed to the continuously variable transmission, from the engine output torque based on the selected parameter value and from the gear ratio, thereby to control an actual feed fluid pressure to the target feed fluid pressure.

In the continuously variable transmission control system, the first and second parameter values may be a target average effective pressure of the engine.

DESCRIPTION OF THE PREFERRED EMBODIMENT

The invention will be described in connection with a preferred embodiment with reference to FIGS. 1 and 2.

Figure 1:
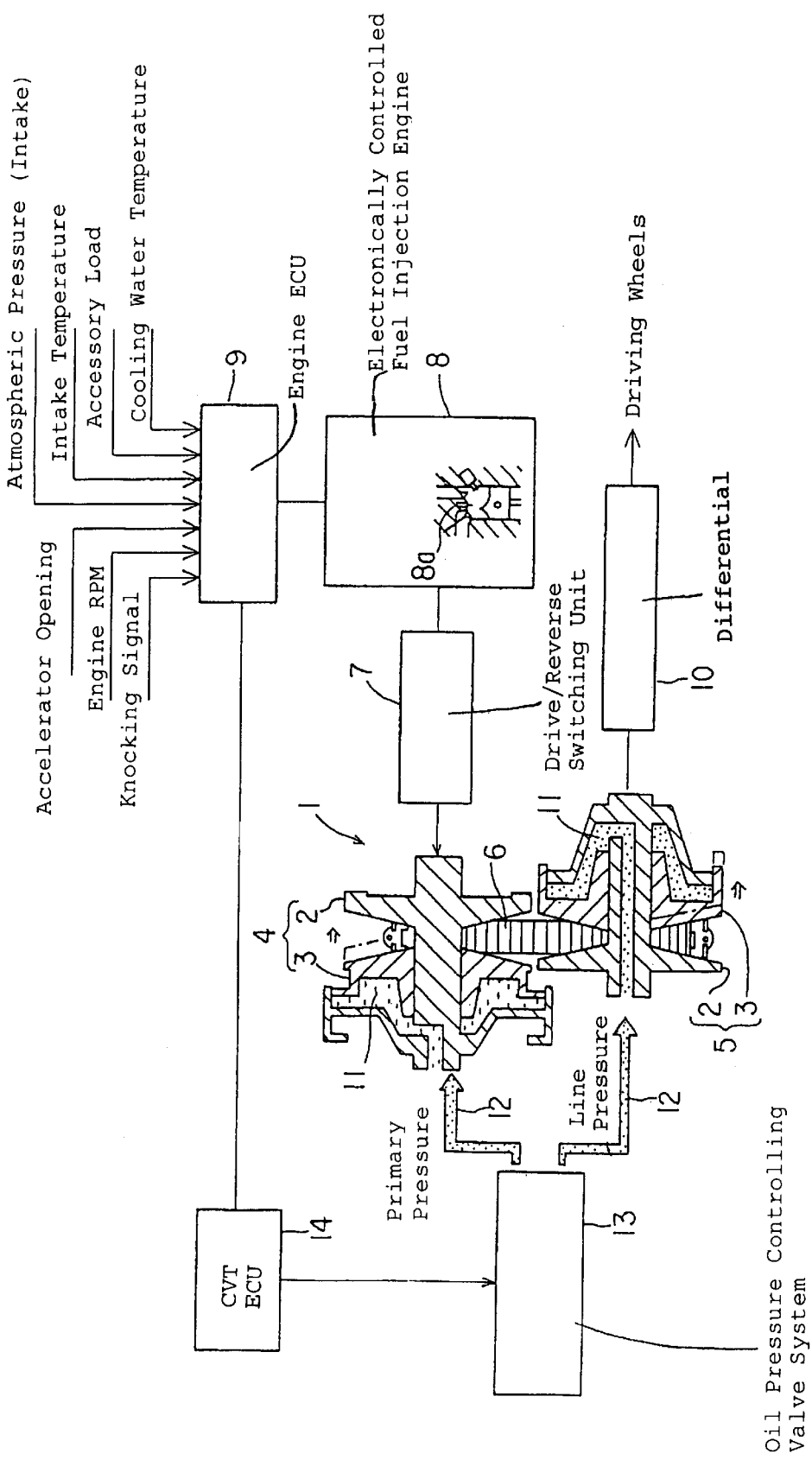
FIG. 1 is a diagram for explaining a CVT control system according to one embodiment of the invention.

FIG. 1 schematically shows a control system of a continuously variable transmission system mounted on an automobile (or a vehicle). Reference numeral 1 designates a belt type continuously variable transmission (as will be called the "CVT").

The CVT 1 includes: a pair of (primary/secondary) pulleys 4 and 5, each having a stationary side pulley unit 2 and a movable side pulley unit 3 in combination and a variable groove width; and a belt member such as a metallic belt 6 provided on those two pulleys 4 and 5.

Of these, the primary pulley 4 is connected, through a drive/reverse switching unit 7, for example, to the crankshaft (or output portion) of an engine such as an electronically controlled fuel injection engine 8 (as will be called merely as the "engine") having an injector 8a, so that it receives the output from the engine 8. Here, engine controlling element, such as an engine ECU 9, is connected to the engine 8, and the engine ECU 9 controls the injection rate of a fuel to be injected from the injector 8a in accordance with a variety of drive modes preset in the ECU 9.

The secondary pulley 5 is connected, through a differential 10, for example, to the drive wheels of the automobile.

At each side of the individual movable side pulley units 3 of the pulleys 4 and 5, there are formed oil pressure chambers 11 for moving the pulley units 3. These oil pressure chambers 11 are connected individually via oil passages 12 to hydraulic control element such as an oil pressure controlling valve system 13 composed of various control valves in combination, for example, so that the oil pressures applied to the two oil pressure chambers 11 can be controlled by that system 13.

With this oil pressure controlling valve system 13, there is connected a CVT control element such as a CVT ECU 14 (composed of a microcomputer). This CVT ECU 14 is set with a target gear ratio, as predetermined according to the drive state of the automobile, as well known in the art, so that the oil flow to the oil pressure chamber 11 on the side of the primary pulley 4 can be adjusted by the control of the oil pressure controlling valve system 13 on the basis of that gear ratio. On the other hand, the CVT ECU 14 is given: a function to set a target line pressure on the basis of the input torque of the CVT 1, as inputted from the communication with the engine ECU 9, i.e., the engine output torque and the gear ratio determined on the drive state; and a function to control the oil pressure in the oil pressure chamber 11 on the secondary pulley 5 for that target line pressure, so that the line pressure is controlled by those functions to push the belt 6 sliplessly onto the secondary pulley 5. By thus controlling the gear ratio and the line pressure in the CVT ECU 14, the winding diameter of the belt 6 to run between the two pulleys 4 and 5 is changed so that the engine RPM to be inputted from the primary pulley 4 is changed and outputted from the secondary pulley 5.

The present invention is applied to this line pressure control of the CVT 1. According to this invention, a first line A existing in the art is combined with a second line B as shown in FIG. 2. In the first line A, more specifically, a target average effective pressure (i.e., the value obtained by dividing the output torque of the engine by the displacement of the engine: a first parameter value, as will be called the "first target Pe") indicating the engine output torque is determined by the engine ECU 9 from a demanded value of the engine output demanded by the driver, such as the information of an accelerator opening and the information of the engine RPM, and is sent to the CVT ECU 14. In the second line B, on the other hand, a parameter value indicating the engine output torque is determined from a parameter value corresponding to the injection rate of the fuel into the engine 8 and is sent to the CVT ECU 14. This combination of the invention is intended to compensate the defect of the line pressure control of the prior art, as based on the first target Pe (or torque information) and the gear ratio but is defective in the precision despite of a quick output timing.

Specifically, the engine ECU 9 is set, as the first line A, with: a map α based on the accelerator opening and the engine RPM; a function to read the first target Pe according to the accelerator opening and the engine RPM from the map α; and a function to send the first target Pe read to the CVT ECU 14. In short, the first line A is to obtain the torque information to be outputted, in accordance with the demand of the driver.

Moreover, the engine ECU 9 is set, as the second line B, with: various maps β and δ of an average effective pressure Pe (as will be called the "second target Pe") based on the injector pulse width and the engine RPM of the fuel injection nozzle 8a for every different fuel characteristics; a function to read the second Pe according to the injector pulse width and the engine RPM from the maps β to δ of the fuels used, by selecting the maps; and a function to send the second target Pe read to the CVT ECU 14. In short, the second line B is to obtain the torque information at the time when the torque is being outputted from the engine 1, in accordance with the fuel injection rate. This torque information indicates the torque which is generated when the fuel is actually injected from the injector 8a and is burned, while considering the atmospheric pressure and the intake temperature. Therefore, the torque information has characteristics contrary to those of the torque information obtained by the first line A, so that it is characterized to have a slow output timing but a high precision.

In order to obtain a higher precision, moreover, the first target Pe and the second target Pe which are obtained from the first line A and the second line B are corrected. Specifically, the engine ECU 9 is set with: a knocking learning correcting function 16 to correct the first target Pe determined from the map α, according to the individual fuel characteristics; and an atmosphere correcting function 17, and an intake temperature correcting function 18, to correct the same with the environmental condition under which the engine 1 runs, thereby to enhance the precision of the first target Pe. Moreover, the engine ECU 9 is set with an accessory load correcting function 19 to subtract the load component of accessories to be driven by the engine 1, from the second target Pe determined from the individual maps β to δ, so that the torque information subtracting the load on the accessories may be inputted to the CVT ECU 14 so as to establish the same relation as that of the power transmission which is actually inputted to the CVT 1. Under the same condition, therefore, it is possible to obtain both the value of the first target Pe to be outputted and the value of the second target Pe just being outputted at the instant under consideration.

Figure 2:
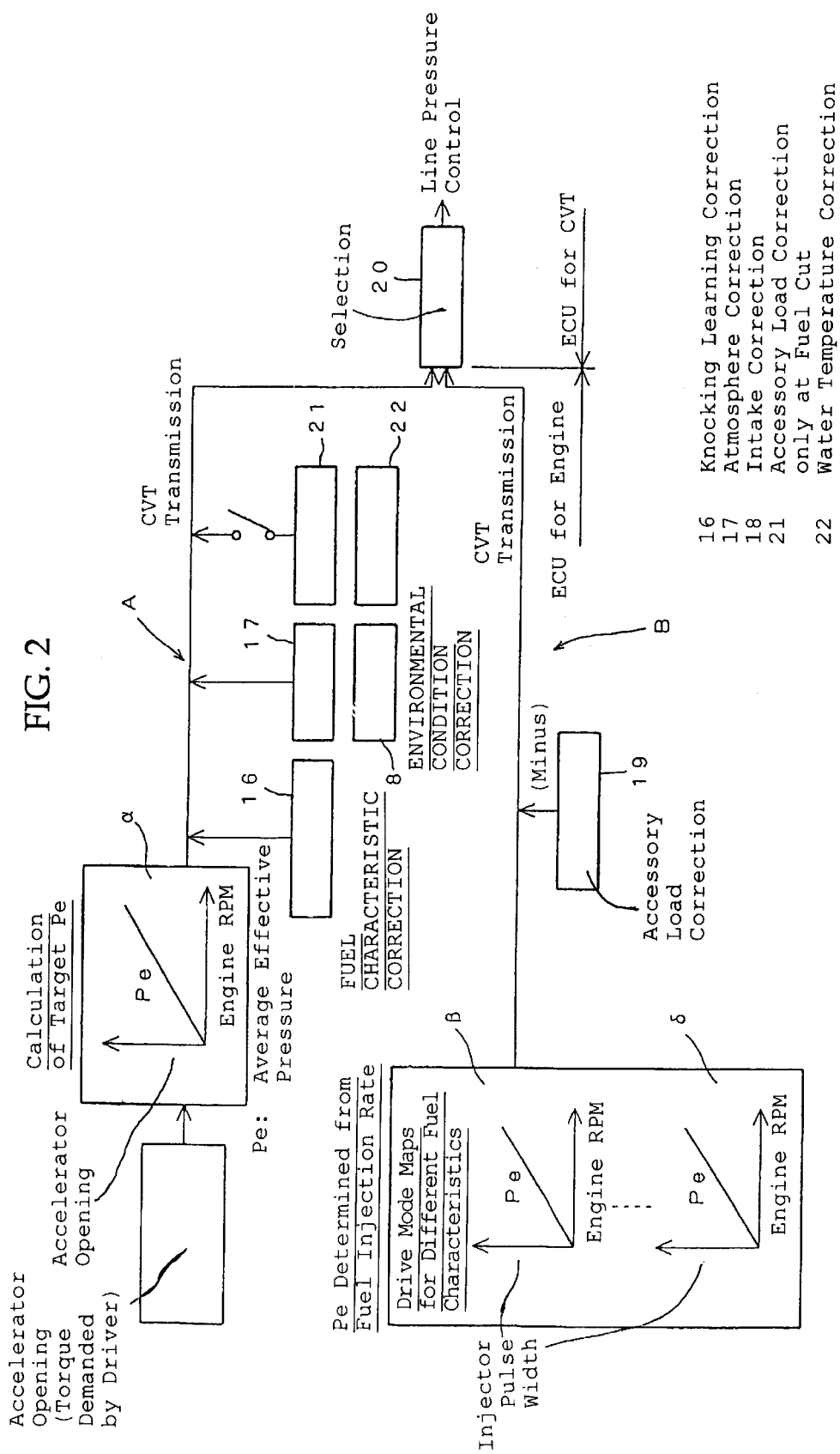
FIG. 2 is a diagram for explaining how the CVT is controlled by the control system on the basis of an engine output torque estimated from a driver's demand value and an engine output torque estimated from a fuel injection rate.

As shown in FIG. 2, the CVT ECU 14 is further set with a selecting function 20 as a selection element for selecting one of the value of the first target Pe outputted from the first line A and the value of the second target Pe outputted from the second line B, by comparing the two. Here, the selecting function 20 is set to select the higher value of the first target Pe and the second target Pe, when the torque is abruptly raised, and the second target Pe when in a steady state. Moreover, the selected value of the first target Pe and the second target Pe is inputted to a program for the line control to function, so that the target line pressure may be determined on the basis of the value of the same Pe and the gear ratio.

The engine ECU 9 is set with: an accessory load correcting function 21 to add the load of the accessories connected to the engine 1, to the value of the first target Pe, as obtained from the first line A, only when the vehicle is decelerated to cut provision of the fuel; and a cooling water temperature correcting function 22 (because the friction is changed with the cooling water temperature) to consider the friction of the engine 1, so that the CVT 1 may be able to stand the deceleration load when the vehicle is driven by cutting provision of the fuel. In other words, the force to push the belt 6 considers the load during the deceleration.

With this construction, the line pressure is quickly raised at a speed changing time when the torque abruptly rises, and the power transmission can be effected suppressing the frequency of generating an excessive belt pushing force when in the steady drive with little torque change.

This point will be described in the following. During the drive of the automobile, the first target Pe, as determined on the basis of the accelerator opening and the engine RPM, is corrected in the first line A individually by the knocking learning correcting function 16, the atmosphere correcting function 17, and the intake temperature correcting function 18, and is sent to the CVT ECU 14. In the second line B, on the other hand, the second target Pe, as determined by using the map selected from the maps β to δ according to the fuel characteristics such as premium gasoline or regular gasoline and on the basis of the injector pulse width and the engine RPM or the parameters of the fuel injection rate calculated from the running state of the engine, is corrected by the accessory load correcting function 19 and is set to the CVT ECU 14.

At this time, it is assumed that the driver abruptly depresses the accelerator pedal to make a speed change to raise the torque abruptly.

In response to the abrupt rise of the torque, the selecting function 20 selects the higher value of the first target Pe and the second target Pe. The CVT ECU 14 determines the target line pressure from the engine output torque, as based on the selected target Pe, and the gear ratio thereby to control the actual line pressure to the target value.

Thus, the line pressure abruptly rises to match the high value so that the belt slippage can be prevented.

In the steady state with little torque change, the second target Pe of higher precision is selected to control the line pressure so that the excessive belt pushing force can be suppressed to improve the fuel economy.

Moreover, the individual targets Pe of the first line A and the second line B are given values near the torque actually outputted from the engine 1, by correcting them with the parameter value indicating the fuel characteristics (e.g., premium/regular), the parameter value indicating the environmental conditions (e.g., the atmospheric pressure or the intake temperature) under which the engine 1 runs, and the parameter value indicating the accessory loads. As a result, a more precise control of the CVT 1 can be made to further suppress the frequency of generating the excessive belt pushing force.

With the simple construction in which the accessory load is considered only in the first line A but not in the other line B, moreover, the CVT 1 can be controlled to stand the deceleration load when the vehicle is run by cutting provision of the fuel.

Let it be assumed that the fuel cutting drive is entered by depressing the brake pedal to decelerate the vehicle while releasing the accelerator pedal. At this time, the engine output torque, estimated from the injector pulse width of the second line B, is zero (or minus). On the other hand, the engine output torque estimated from the accelerator opening of the first line A is zero beforehand. To this zero value, there is added, from the accessory load correcting function 21, the load for driving the accessories driven by the engine 1. As a result, the selecting function 20 selects the first target Pe of the first line A, to which the accessory driving load is added. On the basis of this first target Pe, the target line pressure is set to quickly start the line pressure control capable of standing the deceleration load, which is transmitted through the belt 6 from the drive wheels to the engine 1 to rotate the engine 1 idly and to drive the accessories. By the simple control of the first line A considering only the accessory load, therefore, the control of the CVT 1 standing the deceleration load can be quickly made in response to the fuel cutting drive.

Here, the embodiment employs the accelerator opening as the value demanded by the driver and the injector pulse width as the fuel injection rate. However, the parameters should not be limited to them but may naturally be exemplified by others.

According to the invention, as has been described hereinbefore, the responsiveness can be retained to prevent the belt slippage at a shifting time when the torque abruptly changes, and the speed change suppressing the excessive pushing force can be made in the steady state of the continuously variable transmission when the torque change is little, so that the fuel economy can be improved.

On the other hand, the continuously variable transmission can be simply controlled to stand the deceleration load at the fuel cutting drive. Moreover, the accessory driving load is added to the engine output torque which is estimated on the basis of the value demanded by the driver, so that an excellent responsiveness can be obtained. Thus, the invention has an effect that the continuously variable transmission can be brought into the state capable of standing the decelerating run simultaneously as the fuel cutting drive is started.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A control system for a continuously variable transmission, comprising:

a first element for determining a first parameter value indicating an engine output torque from the engine RPM and a value of an engine output demanded by a driver;

a second element for determining a second parameter value indicating an engine output torque from a parameter value corresponding to a rate of fuel injection into the engine;

a selection element for selecting one of said first parameter value and said second parameter value; and a control element for controlling the continuously variable transmission on the basis of the selected parameter value.

2. A continuously variable transmission control system according to claim 1, wherein said selection element outputs, at a fuel cutting drive, a value, determined by adding a load of an accessory connected to the engine to said first parameter value, to said control element.

3. A continuously variable transmission control system according to claim 1, wherein said selection element selects a larger one of said first parameter value and said second parameter value, when the output torque abruptly rises, and said second parameter value when the output torque does not abruptly rise.

4. A continuously variable transmission control system according to claim 1, wherein a force to push a pulley of the continuously variable transmission is controlled by a fluid pressure fed to the continuously variable transmission, wherein the system further comprises a gear ratio detecting element for detecting a gear ratio of the continuously variable transmission, wherein said control element calculates a target feed fluid pressure to be fed to the continuously variable transmission, from the engine output torque based on the selected parameter value and from said gear ratio, thereby to control an actual feed fluid pressure to said target feed fluid pressure.

5. A continuously variable transmission control system according to claim 1, wherein said first and second parameter values are a target average effective pressure of the engine.

6. A control method for a continuously variable transmission, comprising:

calculating a first parameter value indicating an engine output torque from an engine RPM and a value of an engine output demanded by a driver;

calculating a second parameter value indicating an engine output torque from a parameter value corresponding to a rate of fuel injection into the engine;

selecting one of said first parameter value calculated in said first parameter calculating step and said second parameter value calculated in said second parameter calculating step; and controlling the continuously variable transmission on the basis of the selected parameter value.

7. The continuously variable transmission control method according to claim 6, wherein said selecting step outputs, at a fuel cutting drive, a value, which is determined by adding a load on an accessory connected to the engine to said first parameter value, to said controlling step.

8. The continuously variable transmission control method according to claim 6, wherein said selecting step selects a larger one of said first parameter value and said second parameter value, when the output torque abruptly rises, and said second parameter value when the output torque does not abruptly rise.

9. The continuously variable transmission control method according to claim 6, further comprising:

controlling a force to push the pulley of the continuously variable transmission by a fluid pressure fed to the continuously variable transmission; and detecting a gear ratio of said continuously variable transmission, wherein said controlling step calculates a target feed fluid pressure to be fed to the continuously variable transmission, from the engine output torque based on the selected parameter value and from said detected gear ratio, thereby to control an actual feed fluid pressure to said target feed fluid pressure.

10. The continuously variable transmission control method according to claim 6, wherein said first and second parameter values are a target average effective pressure of the engine.

* * * * *